US012256309B2

(12) United States Patent
Novlan

(10) Patent No.: US 12,256,309 B2
(45) Date of Patent: Mar. 18, 2025

(54) MULTIFREQUENCY CONFIGURATION AND MANAGEMENT FOR NEW RADIO-BASED SMART REPEATERS

(71) Applicant: AT&T Intellectual Property I, L.P., Atlanta, GA (US)

(72) Inventor: Thomas Novlan, Jonestown, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 17/661,272

(22) Filed: Apr. 28, 2022

(65) Prior Publication Data

US 2023/0354150 A1    Nov. 2, 2023

(51) Int. Cl.
*H04W 40/22* (2009.01)
*H04W 28/02* (2009.01)
*H04W 72/23* (2023.01)

(52) U.S. Cl.
CPC ....... *H04W 40/22* (2013.01); *H04W 28/0215* (2013.01); *H04W 28/0273* (2013.01); *H04W 28/0289* (2013.01); *H04W 72/23* (2023.01)

(58) Field of Classification Search
CPC ............. H04W 40/22; H04W 28/0215; H04W 28/0273; H04W 28/0289; H04W 72/23; H04W 84/047; H04B 7/15528
See application file for complete search history.

(56) References Cited

U.S. PATENT DOCUMENTS

| 2014/0321318 | A1* | 10/2014 | Persson ................ H04W 72/21 370/254 |
| 2018/0310301 | A1* | 10/2018 | Amini ....................... H04L 1/18 |
| 2020/0280355 | A1* | 9/2020 | Abedini ............... H04W 24/02 |
| 2021/0105062 | A1* | 4/2021 | Abedini ............. H04B 7/15507 |
| 2021/0185588 | A1* | 6/2021 | Ray Chaudhuri ........................... H04W 72/0446 |
| 2022/0015008 | A1* | 1/2022 | Tarighat Mehrabani ..................... H04B 1/0096 |
| 2022/0053433 | A1* | 2/2022 | Abedini ............... H04W 16/28 |
| 2022/0053486 | A1* | 2/2022 | Abedini ............. H04B 7/15542 |
| 2023/0327977 | A1* | 10/2023 | Abedini ................. H04L 45/22 370/329 |
| 2023/0353227 | A1* | 11/2023 | Novlan .................. H04B 7/155 |
| 2023/0354150 | A1* | 11/2023 | Novlan ............. H04W 28/0273 |
| 2024/0022315 | A1* | 1/2024 | Kusashima ........... H04W 16/26 |

* cited by examiner

*Primary Examiner* — Benjamin H Elliott, IV
(74) *Attorney, Agent, or Firm* — Guntin & Gust, PLC; Mark Wilinski

(57) ABSTRACT

The described technology is generally directed to over-the-air configuration and management of new radio multifrequency smart repeaters. To facilitate data forwarding, a smart repeater is configured via a first frequency to generate a forwarding layer that is logically above a physical layer of a mobile termination function (corresponding to a repeater link) and a physical layer of distributed unit function of the repeater equipment (corresponding to an access link, configured to use a second frequency). Via the forwarding layer, when traffic is received from a parent node, the traffic is forwarded via the access link to user equipment, and when traffic is received from a user equipment, the traffic is forwarded via the access link to a parent node. As one example, control plane signaling can be performed via the sub-six gigahertz band, and data plane signal forwarding can be performed via the millimeter wave band.

20 Claims, 11 Drawing Sheets

MULTIFREQUENCY CONFIGURATION AND MANAGEMENT FOR NEW RADIO-BASED SMART REPEATERS

TECHNICAL FIELD

The subject application is related to wireless communication systems, and, for example, to configuring and managing layer-1 (L1) based repeaters, including in fifth generation (5G) new radio (NR) networks and beyond, and related embodiments.

BACKGROUND

Due to the expected larger bandwidth available for new radio (NR) along with the native deployment of massive multiple input multiple output (MIMO) or multi-beam systems in NR, there is now an opportunity to develop and deploy smart repeaters (also called network controlled repeaters). A smart repeater node utilizes a layer-1 forwarding approach to take the downlink (DL) NR signal from a donor cell (e.g., macro distributed unit, or DU) received at a repeater link and provide the signal to user devices (user equipment, or UE) that may be beyond the coverage of the donor cell via a repeater access link. Additionally, the smart repeater can provide the uplink (UL) signal from the user device to its serving cell/donor DU. Because the signals on the access and repeater link are intended to be identical, the user can connect to the smart repeater in a transparent manner (in contrast with an L2/L3 relay node such as Integrated Access and Backhaul (IAB)).

Conventional repeaters that operate using layer-1 forwarding approaches only attempt to replicate the repeater link received at the repeater node on an access link to the user devices. Because deployment of the repeater increases the signal strength of the parent node (donor DU), such deployment also may potentially increase interference to neighbor cells. Repeater transmissions also need to be carefully time-aligned with the transmissions from the donor DU in order avoid cross-link interference between DL and UL signals, particularly in the case of networks operating on time division duplex (TDD) bands. Furthermore, the utilization of dynamic analog and digital beamforming at gNodeBs (gNBs) and UE devices makes the deployment and management of conventional repeaters more challenging because the adaptation of the beamforming pattern and any sweeping of beams for control and access are dynamically managed over-the-air (OTA), and in some cases is user-specific (e.g., for channel status information (CSI) acquisition and data plane transmissions).

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
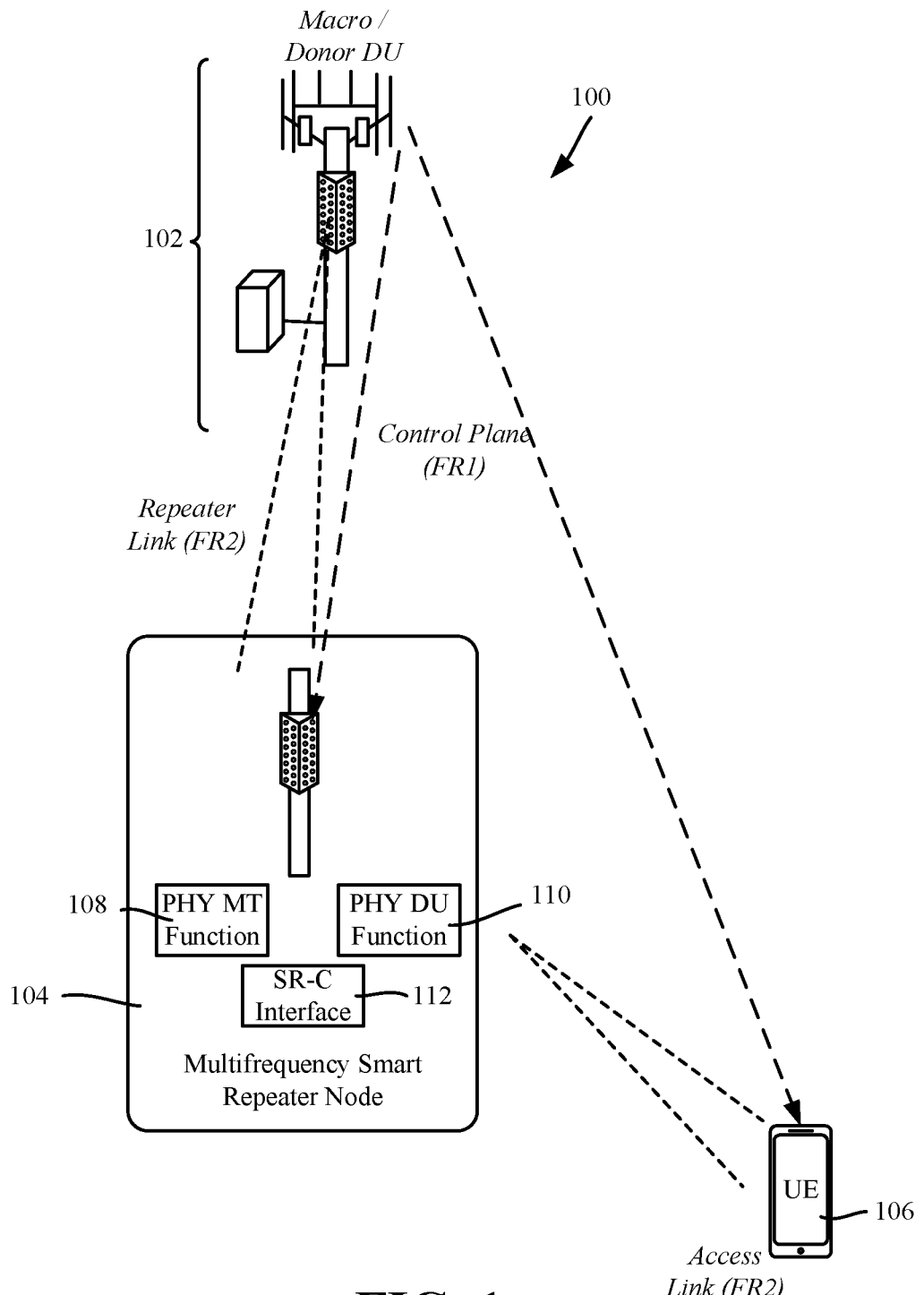
FIG. 1 illustrates an example wireless communication system in which a multifrequency repeater node communicates via a repeater link on one frequency band and an access link on another frequency band, in accordance with various aspects and embodiments of the subject disclosure.

Various aspects of the technology described herein are directed towards over-the-air configuration and management of multifrequency smart repeaters that can adapt the physical layer parameters used by the smart repeater for layer-1 forwarding operation. As described herein, multifrequency usage such as dual connectivity (e.g., NR-DC) are described at both the smart repeater and access UE in order to support both control and data plane transmission over multiple frequencies. As one example, a first frequency band can be in the sub-six gigahertz frequency range, and the second frequency band can be in the millimeter wave frequency range.

It should be understood that any of the examples and terms used herein are non-limiting. For instance, the examples are based on New Radio (NR, sometimes referred to as 5G) communications between a user equipment device exemplified as a smartphone, mobile device or the like and network node devices via a smart repeater; however virtually any communications devices may benefit from the technology described herein. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g., LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that the solutions outlined applies for Multi RAB (radio bearers) on some carriers (that is data plus speech is simultaneously scheduled).

In various embodiments, a network can be configured to provide and employ 5G wireless networking features and functionalities. With 5G networks that may use waveforms that split the bandwidth into several sub-bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

FIG. 1 illustrates an example wireless communication system 100 comprising a parent node (macro/donor distributed unit (DU) 102 communicating, via a multifrequency smart repeater node 104, with a user equipment (UE) 106. In general, the smart repeater node 104 communicates with the donor DU 102 via a repeater link, and communicates with the UE 106 via an access link.

To act as repeater, the multifrequency smart repeater node 104 is configured with a mobile termination (MT, or UE-like) function 108 comprising a layer-1 physical (PHY) layer corresponding to the repeater link. The smart repeater node 104 is also configured with a DU (gNB-like) function 110 comprising a layer-1 (L1) physical (PHY) layer corresponding to the access link. As also shown in FIG. 1 and as described herein, a smart repeater control (SR-C) management function acts as an SR-C interface 112 between the repeater's MT functionality and the repeater's DU functionality.

In one example, both the repeater and access links may utilize all of the frequencies for both control and data plane transmissions. Alternatively, as shown in FIG. 1, one frequency band, e.g., the millimeter wave FR2 band from 24.25 GHz to 52.6 GHz can be used for the repeater link and the access link. The millimeter wave FR2 band provides higher bandwidth for data plane signaling, but a shorter range of coverage. Control plane signaling can use the sub-six gigahertz frequency range (e.g., FR1 band), and thus has sufficient coverage range to reach both the multifrequency smart repeater node 104 and the user equipment 106.

As described herein, a multifrequency smart repeater node 104 is thus provided that is able to operate in a case of multifrequency NR networks using different resource aggregation techniques, including carrier aggregation (CA) and dual connectivity (DC). To summarize as shown in FIG. 1, NR-DC is supported at the multifrequency smart repeater 104 and the access UE 106. In this case, the control plane information for the access UE(s) and the smart repeater(s) can be directly provided via the donor node 102 over FR1, while the data plane information is sent via the smart repeater node over FR2 indirectly from the donor node, as the donor node 102 may not have sufficient coverage to reach the access UE.

Figure 2:
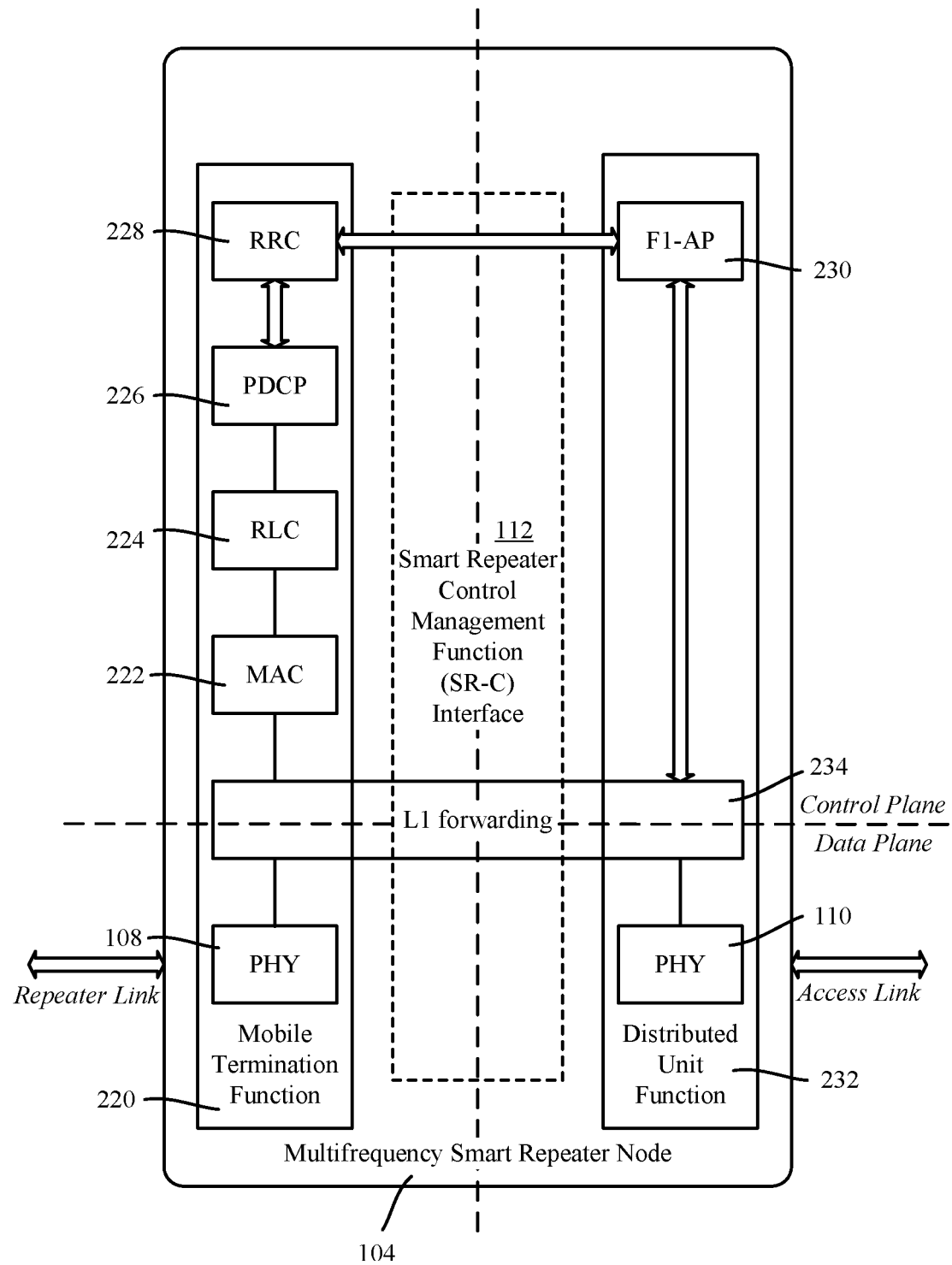
FIG. 2 is an example protocol stack of a multifrequency smart repeater node including a smart repeater control management function and interface, in accordance with various aspects and embodiments of the subject disclosure.

Additional details of the multifrequency smart repeater 104 are shown in FIG. 2, which illustrates an exemplary protocol stack structure for the smart repeater node 104. When the repeater links carrying the traffic from the donor node are based on the same channels and protocols as the access links carrying user data traffic, as shown in FIG. 2 the smart repeater node 104 can be constructed to contain two parallel protocol stacks. The mobile termination (MT) functionality provides connectivity between the smart repeater node and its parent donor node, which has a wired connection to the core network; (it is feasible for a repeater node to be a parent node to another repeater node and so on, however ultimately there is a donor DU node). The mobile termination (MT) functionality 220 thus includes a protocol stack comprising the PHY (MT function) layer 108, medium access layer (MAC) layer 222 radio link control (RLC) layer 224 packet data convergence control (PDCP) layer 226 and radio resource control (RRC) layer 228. The radio resource control 228 couples to the F1 Application Protocol (F1-AP) 230 of the distributed unit functionality 232.

In general, the gNB function or distributed unit (DU) function 232 provides connectivity between the smart repeater node and access UEs. Note that on the DU function 232, unlike IAB or other L2/L3 relay nodes, the smart repeater 104 only implements the physical layer of the DL and UL protocol stack because of the use of a layer-1 forwarding approach. This may facilitate easier deployment of a dense network of access points by building upon many of the control and data channels/procedures defined for providing access to UEs. An example is shown in FIG. 1, where the repeater node 104 can multiplex access and repeater links in time, frequency, or space (e.g., beam-based operation).

To this end, in one embodiment described herein and shown in FIG. 2, as part of the smart repeater air interface higher layer protocols, in order to route the repeater data plane traffic within the smart repeater node, an L1 forwarding layer 234 is generated and inserted above the PHY layer 108 of the MT function 220 and above the PHY layer 110 of the DU function 232 of the smart repeater node 104. The L1 forwarding layer 234 facilitates the data forwarding operations of the smart repeater node 104.

In addition to data forwarding, the smart repeater node 104 needs to manage the control plane signaling and configurations for the MT function 220, and if also forwarding control plane signals in certain scenarios, the DU function 232. Note that the control plane signaling and configuration management of the DU function 232 may not be needed when the control plane signaling is directly from the donor node 102 to the UE as in FIG. 1. As shown in FIG. 2, an example of control plane signaling for the MT function involves layer-1 messages (e.g., physical downlink control channel (PDCCH) and/or Master Information Block (MIB)/system information (SIB) messages), medium access control (MAC) 222, and radio resource control (RRC) 228, along with the F1-AP interface 230 and operations, administration and maintenance (OAM) for the DU function 232. This coordination is performed internally in the smart repeater node by the smart repeater control management function/(SR-C) interface 112.

Figure 3:
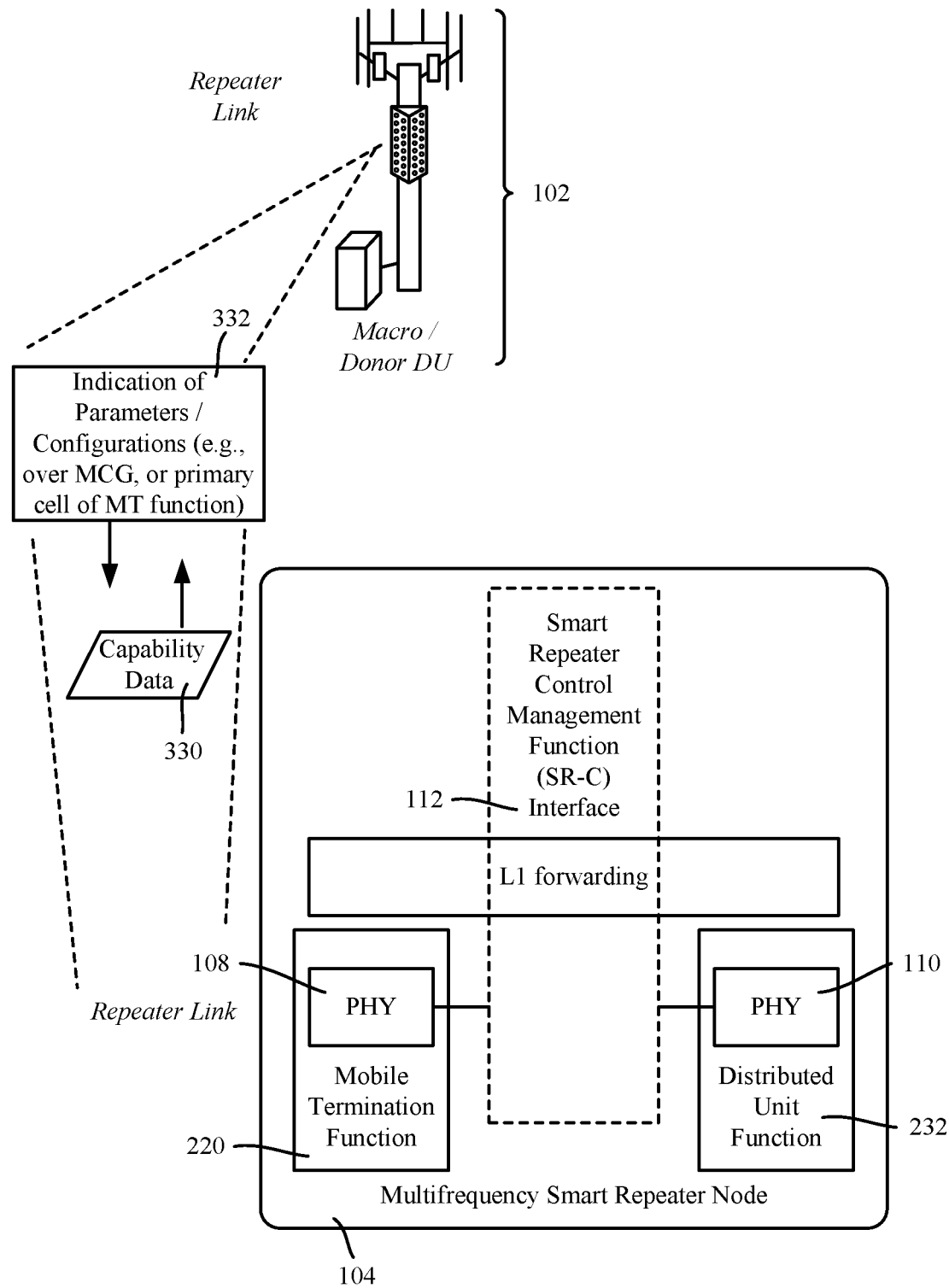
FIG. 3 illustrates an example of a multifrequency smart repeater node being configured based on repeater capability data, in accordance with various aspects and embodiments of the subject disclosure.

In order to support the multifrequency NR-DC operation within one or more frequency carriers or bands, coordination and signaling of the smart repeater resource configurations is used depending on the smart repeater node physical layer capabilities. As such, as generally represented in FIG. 3, the multifrequency smart repeater node 104 communicates its multifrequency capabilities (capability data) 330 to the donor DU 102. In response, the donor node 102 may provide an indication of parameters/configurations (block 332) for multifrequency NR-based smart repeaters, which can be on a different band from the band used for layer-1 forwarding of control and/or data plane resources. In one example, the indication and configuration of parameters (block 332) are provided over a main cell group (MCG) of the smart repeater node MT function 220 using a signaling radio bearer (SRB). In a second example the configuration may be provided via physical layer (L1 or MAC) or higher layer signaling (RRC) on a primary cell of the MT function of the smart repeater node.

Figure 4:
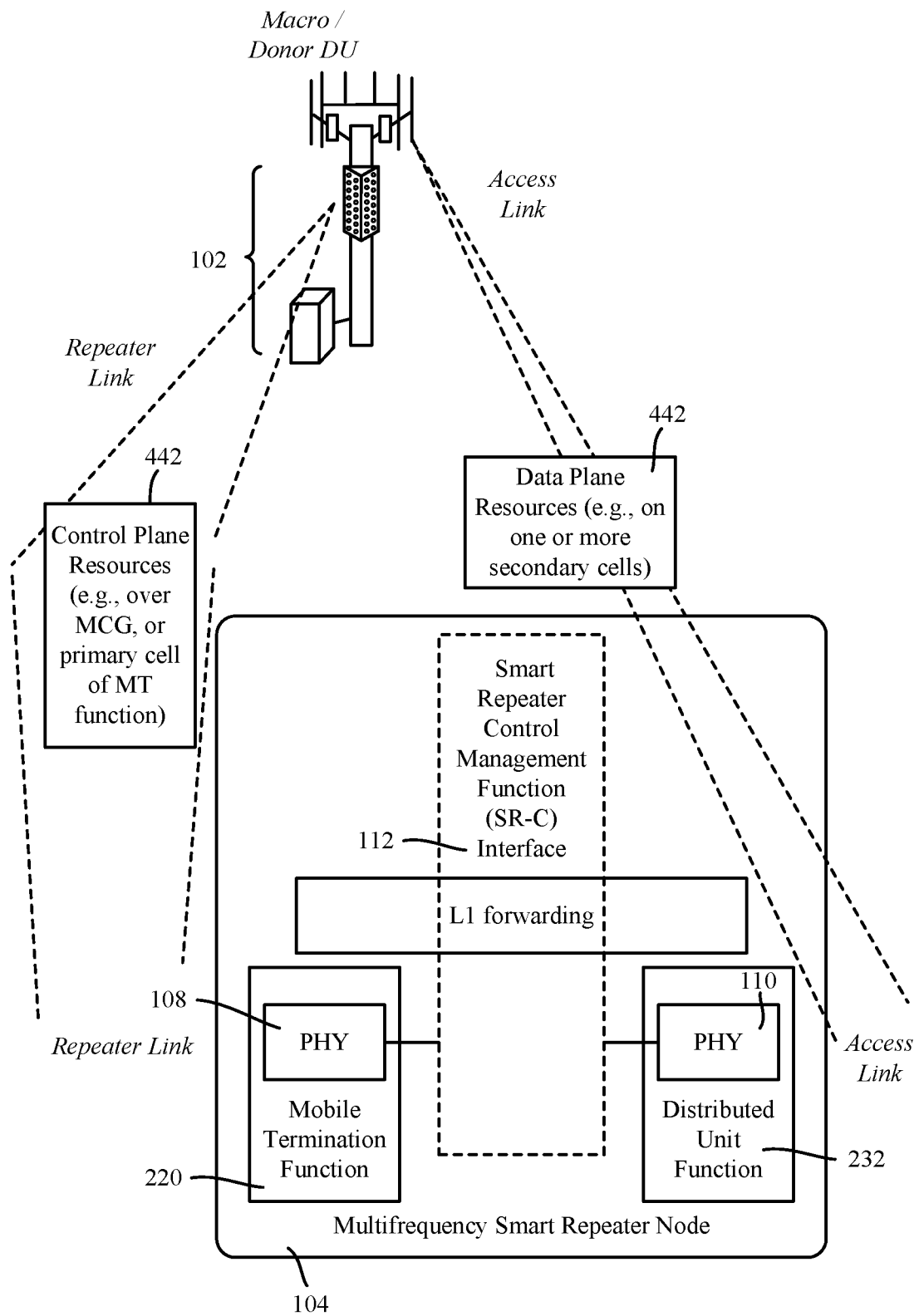
FIG. 4 illustrates an example of a smart repeater node communicating control plane resources via a repeater link and data plane resources via an access link, in accordance with various aspects and embodiments of the subject disclosure, in accordance with various aspects and embodiments of the subject disclosure.

In another alternative generally represented in FIG. 4, the connection between the smart repeater MT function 220 and the donor node 102 on the MCG or primary cell enables indication of control plane resources 442 for one or more repeater link frequencies of a smart repeater on the primary cell. This can be separate from the indication of resources defined for data plane resources 444 on the access link which may be provided on one or more secondary cells.

Figure 5:
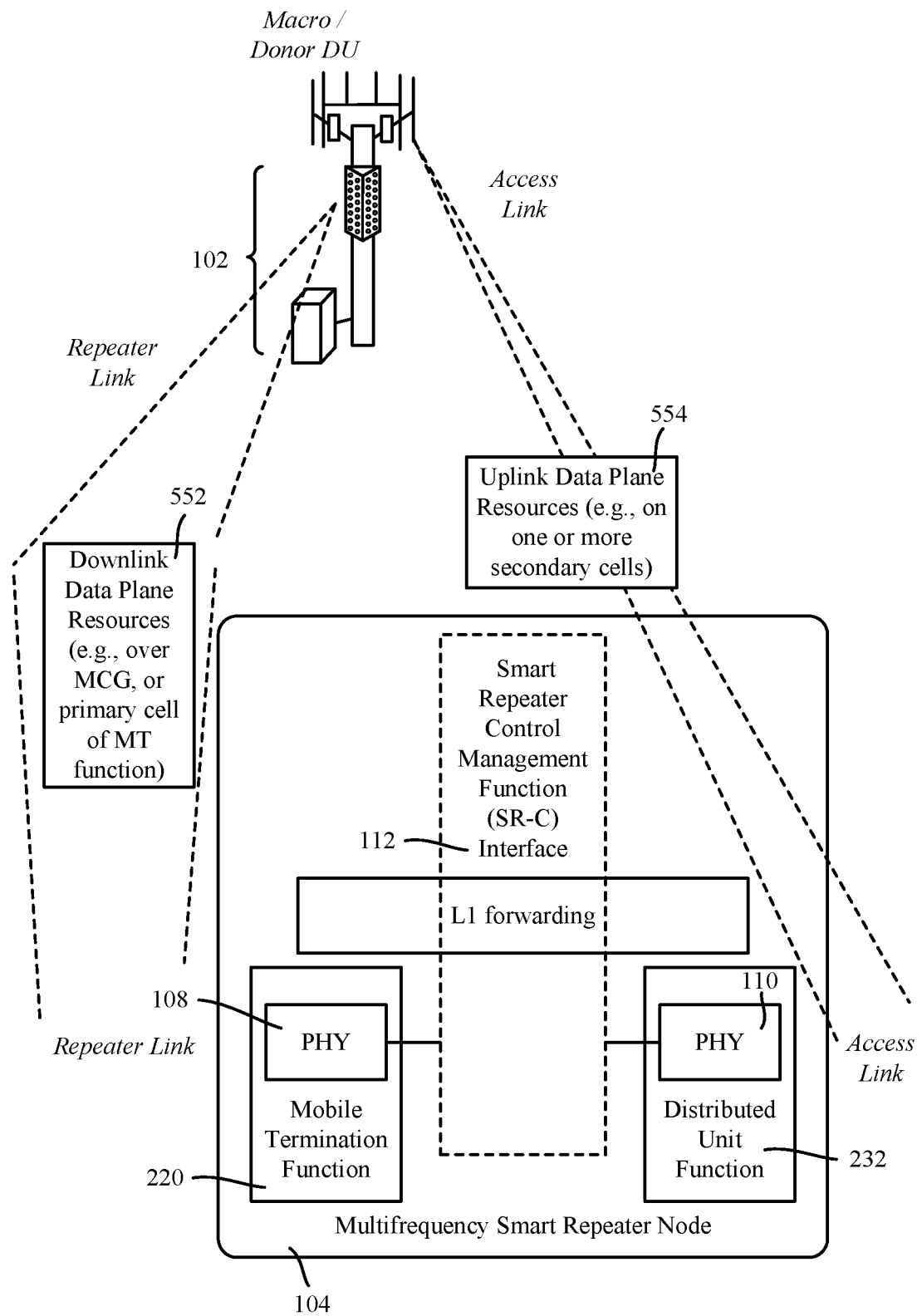
FIG. 5 illustrates an example of a smart repeater node communicating downlink data plane resources via a repeater link and uplink data plane resources via an access link, in accordance with various aspects and embodiments of the subject disclosure, in accordance with various aspects and embodiments of the subject disclosure.

In another alternative generally represented in FIG. 5, the connection between the smart repeater MT function 220 and the donor node 102 on the MCG or primary cell enables indication of downlink data plane resources 552 for one or more access link frequencies of a smart repeater. This can be separate from the indication of resources defined for uplink data plane resources 554 on the access link which may be provided on one or more secondary cells.

Figure 6:
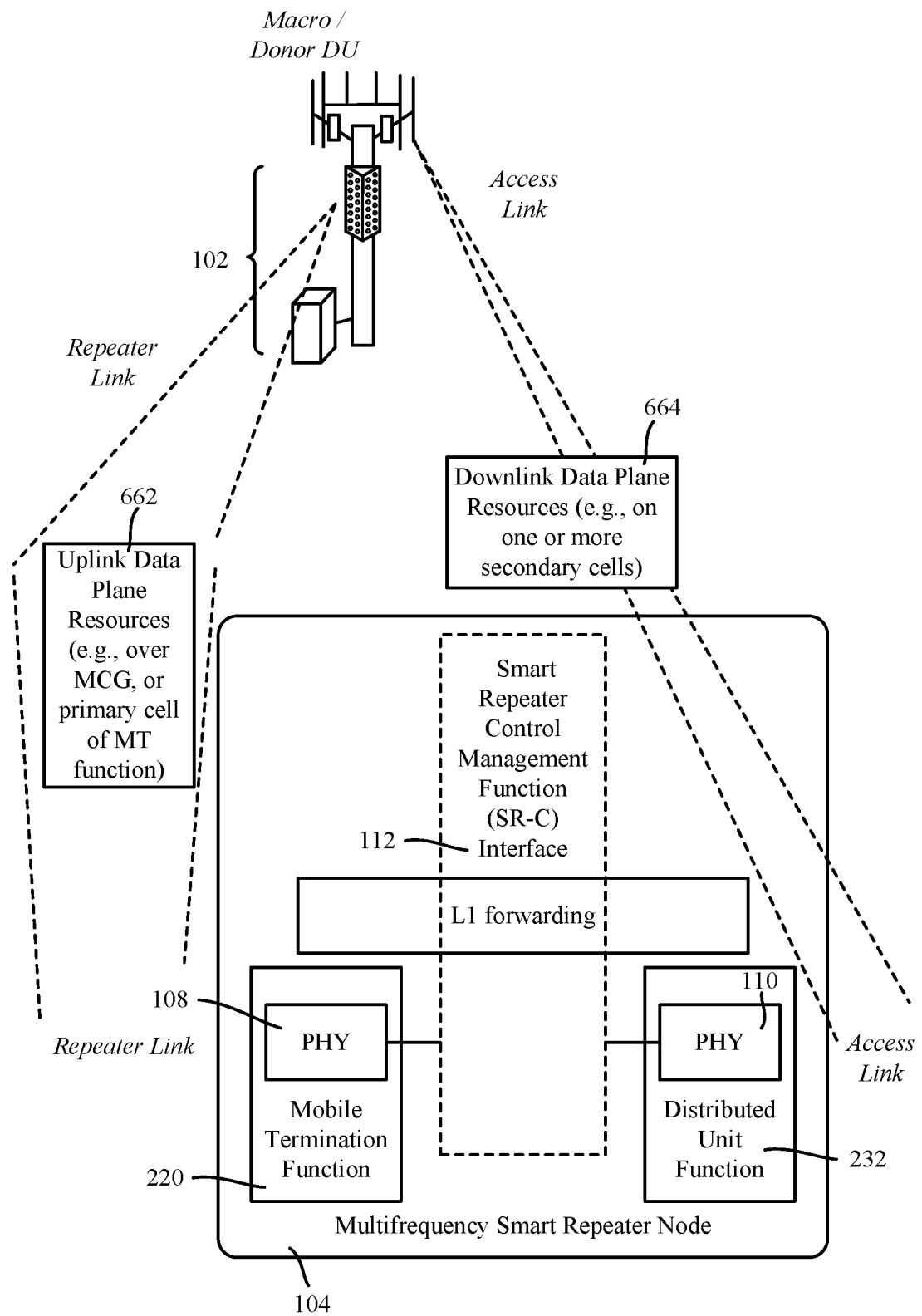
FIG. 6 illustrates an example of a smart repeater node communicating uplink data plane resources via a repeater link and data plane resources via an access link, in accordance with various aspects and embodiments of the subject disclosure, in accordance with various aspects and embodiments of the subject disclosure.

In another alternative generally represented in FIG. 6, the connection between the smart repeater MT function 220 and the donor node 102 on the MCG or primary cell enables indication of uplink data plane resources 662 for one or more access link frequencies of a smart repeater. This can be separate from the indication of resources defined for downlink data plane resources 664 on the access link which may be provided on one or more secondary cells.

Note that in addition to multifrequency support, the control and data resources additionally may be multiplexed in time and/or spatial (e.g., separate beams) for the repeater and access links separately.

For any of the embodiments described herein, it should be noted that the physical layer signaling or higher layer signaling used for configuration of the multifrequency smart repeater 104 may be scheduled (e.g., periodic) and configured by the parent node. In another alternative, the parent node may provide the indications in an aperiodic or "on-demand" manner, such as only when the parameters are modified. In another alternative, the smart repeater may request the parent node to provide a given resource configuration, and may request a set or subset of parameters and corresponding values based on a desired implementation at the smart repeater. These alternatives can be combined, e.g., periodic or other scheduled configuration can be planned, yet overridden on-demand when needed, and/or overridden by a smart repeater request. On-demand configuration can be overridden by a smart repeater request, and so on.

Figure 7:
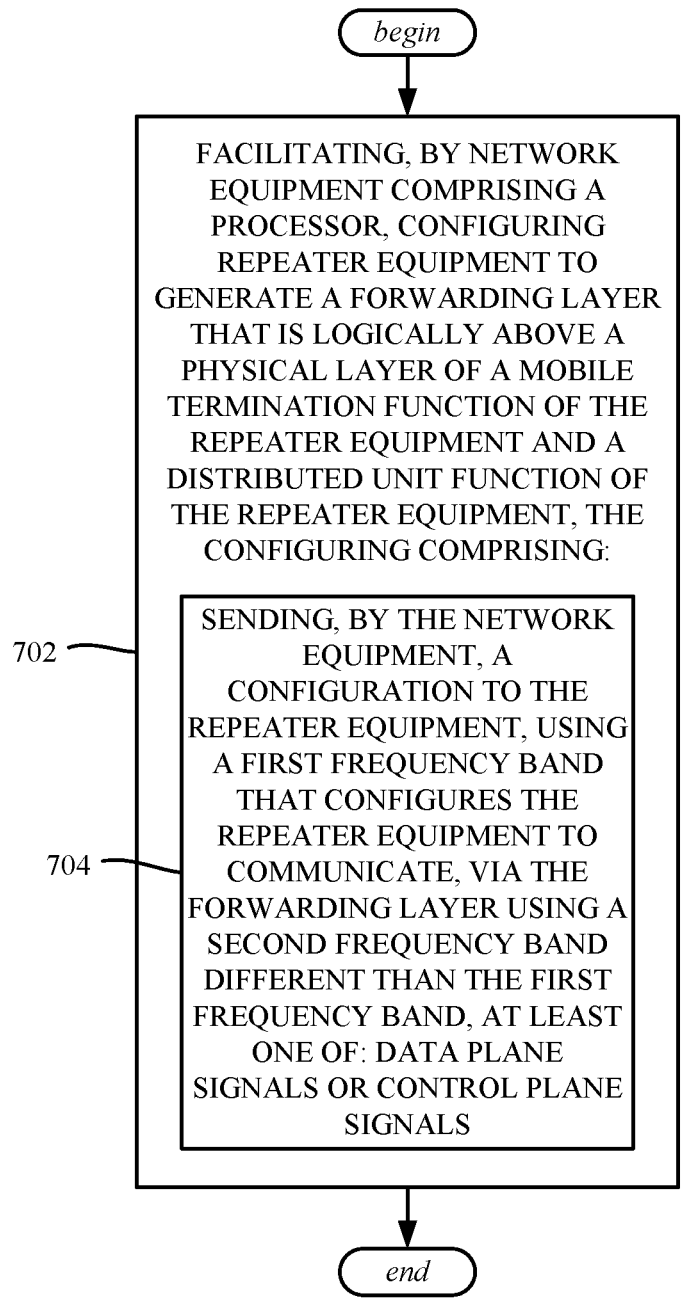
FIG. 7 is a flow diagram showing example operations related to facilitating the configuring of repeater equipment via a first frequency band to generate a forwarding layer for forwarding communications via a second frequency band, in accordance with various aspects and embodiments of the subject disclosure.

One or more aspects are represented in FIG. 7, and can include example operations, such as of a method. Example operation 702 represents facilitating, by network equipment comprising a processor, configuring repeater equipment to generate a forwarding layer that is logically above a physical layer of a mobile termination function of the repeater equipment and a distributed unit function of the repeater equipment. The configuring can include example operation 704, which represents sending, by the network equipment, a configuration to the repeater equipment, using a first frequency band that configures the repeater equipment to communicate, via the forwarding layer using a second frequency band different than the first frequency band, at least one of: data plane signals or control plane signals.

Further operations can include receiving, by the network equipment from the repeater equipment, capability information representative of a capability to support communications using the first frequency band and the second frequency band, wherein the facilitating occurs based on the receiving.

Sending the configuration can include sending the configuration via a main cell group communicatively coupled to the mobile termination function of the repeater equipment using a signaling radio bearer.

Sending the configuration can include sending the configuration via physical layer signaling on a primary cell communicatively coupled to the mobile termination function of the repeater equipment.

Sending the configuration can include sending the configuration via radio resource control signaling on a primary cell communicatively coupled to the mobile termination function of the repeater equipment.

Further operations can include indicating, by the network equipment via a main cell group communicatively coupled to the mobile termination function of the repeater equipment, control plane resources for a repeater equipment link frequency of the repeater equipment on a primary cell, and indicating data plane resources for the access link communicatively coupled to a secondary cell.

Further operations can include indicating, by the network equipment via a primary cell communicatively coupled to the mobile termination function of the repeater equipment, control plane resources for a repeater equipment link frequency of the repeater equipment on the primary cell, and indicating data plane resources for the access link communicatively coupled to a secondary cell.

Further operations can include indicating, by the network equipment via a main cell group communicatively coupled to the mobile termination function of the repeater equipment, downlink data plane resources for an access link frequency of the repeater equipment, and indicating uplink data plane resources for the access link communicatively coupled to a secondary cell.

Further operations can include indicating, by the network equipment via a primary cell communicatively coupled to the mobile termination function of the repeater equipment, downlink data plane resources for an access link frequency of the repeater equipment, and indicating uplink data plane resources for the access link communicatively coupled to a secondary cell.

Further operations can include indicating, by the network equipment via a main cell group communicatively coupled to the mobile termination function of the repeater equipment, uplink data plane resources for an access link frequency of the repeater equipment, and indicating downlink data plane resources for the access link communicatively coupled to a secondary cell.

Further operations can include indicating, by the network equipment via a primary cell communicatively coupled to the mobile termination function of the repeater equipment, uplink data plane resources for an access link frequency of the repeater equipment, and indicating downlink data plane resources for the access link communicatively coupled to a secondary cell.

Further operations can include multiplexing, by the network equipment, communications on the repeater link and access link.

Figure 8:
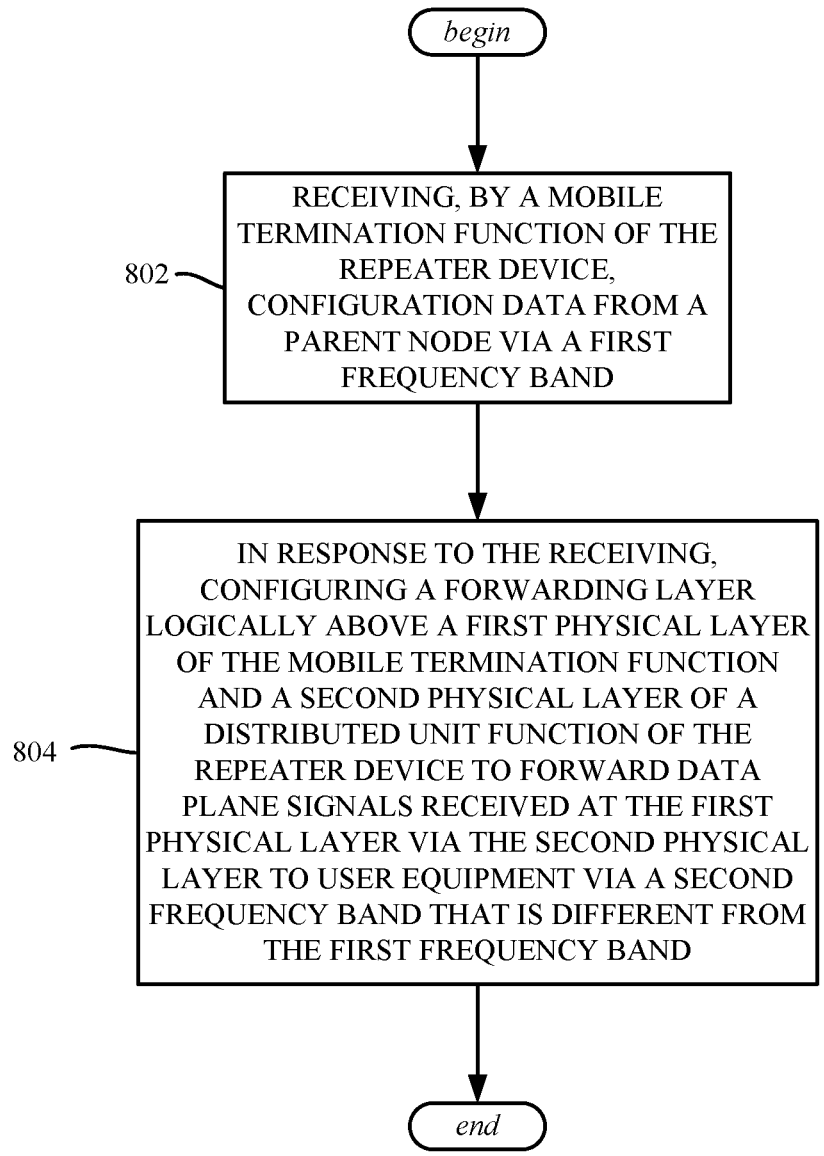
FIG. 8 is a flow diagram showing example operations related to a repeater configuring a forwarding layer based on configuration data received via a first frequency band for forwarding communications via a second frequency band, in accordance with various aspects and embodiments of the subject disclosure.

One or more aspects are represented in FIG. 8, and can comprise example operations, such as of a processor and a memory that stores executable instructions or components, that, when executed by the processor of a repeater device, facilitate performance of the example operations. Example operation 802 represents receiving, by a mobile termination function of the repeater device, configuration data from a parent node via a first frequency band. Example operation 804 represents, in response to the receiving, configuring a forwarding layer logically above a first physical layer of the mobile termination function and a second physical layer of a distributed unit function of the repeater device to forward data plane signals received at the first physical layer via the second physical layer to user equipment via a second frequency band that is different from the first frequency band.

Further operations can include sending, by the repeater device, repeater capability data to the parent node, wherein receiving the configuration data occurs in response to the sending.

Further operations can include multiplexing, by the repeater device based on the configuration data, repeater link data communicated via the first physical layer and access link data communicated via the second physical layer.

Receiving the configuration data can include at least one of: receiving the configuration data from the parent node based on a schedule, receiving the configuration data from the parent node based on modified parameter data, or receiving the configuration data from the parent node based on a request from the repeater device.

The first frequency band can be in the sub-six gigahertz frequency range and the second frequency band can be in the millimeter wave frequency range.

Figure 9:
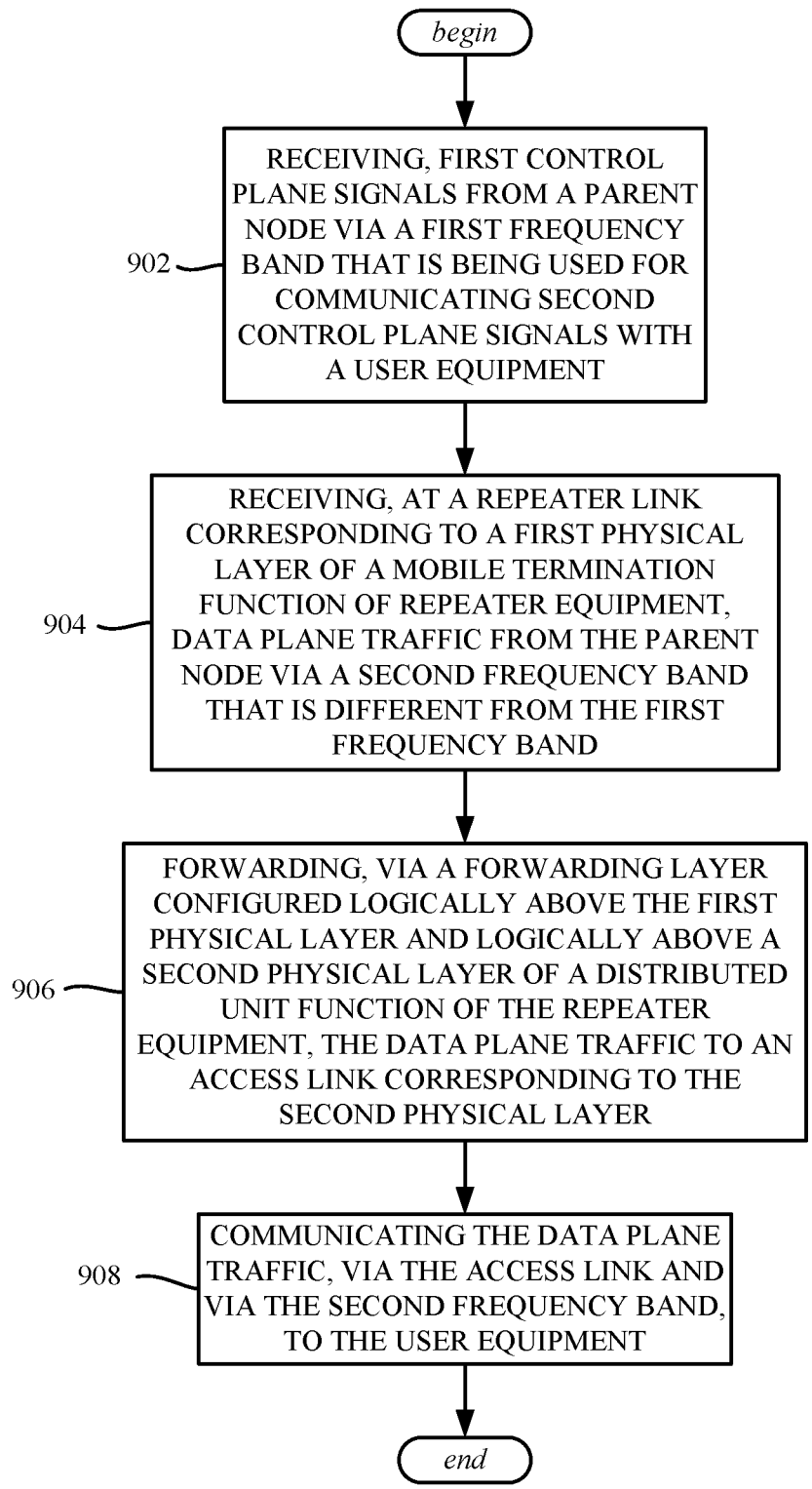
FIG. 9 is a flow diagram showing example operations related to communicating control plane signals via a first frequency band and forwarding communications via a second frequency band, in accordance with various aspects and embodiments of the subject disclosure.

One or more aspects are represented in FIG. 9, and can comprise a machine-readable medium, comprising executable instructions that, when executed by a processor, facilitate performance of example operations. Example operation 902 represents receiving, first control plane signals from a parent node via a first frequency band that is being used for communicating second control plane signals with a user equipment. Example operation 904 represents receiving, at a repeater link corresponding to a first physical layer of a mobile termination function of repeater equipment, data plane traffic from the parent node via a second frequency band that is different from the first frequency band. Example operation 906 represents forwarding, via a forwarding layer configured logically above the first physical layer and logically above a second physical layer of a distributed unit function of the repeater equipment, the data plane traffic to an access link corresponding to the second physical layer. Example operation 908 represents communicating the data plane traffic, via the access link and via the second frequency band, to the user equipment.

The data plane traffic can include first data plane traffic, and further operations can include receiving, via the access link, second data plane traffic from the user equipment, and forwarding, via the forwarding layer, the second data plane traffic to the first physical layer for communication of the second data plane traffic to the parent node via the repeater link.

Further operations can include multiplexing communications of the repeater link and communications of the access link.

As can be seen, the technology described herein facilitates over-the-air configuration and coordination of time, frequency, and spatial (e.g., beam-based) resources for multifrequency NR-based smart repeaters. The technology described herein facilitates, for a multifrequency smart repeater, indication of parameters/configurations, indication of separate data or control plane resources, and/or indication of separate downlink and uplink data plane resources, using, for example, signaling defined for IAB-MT functionality.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
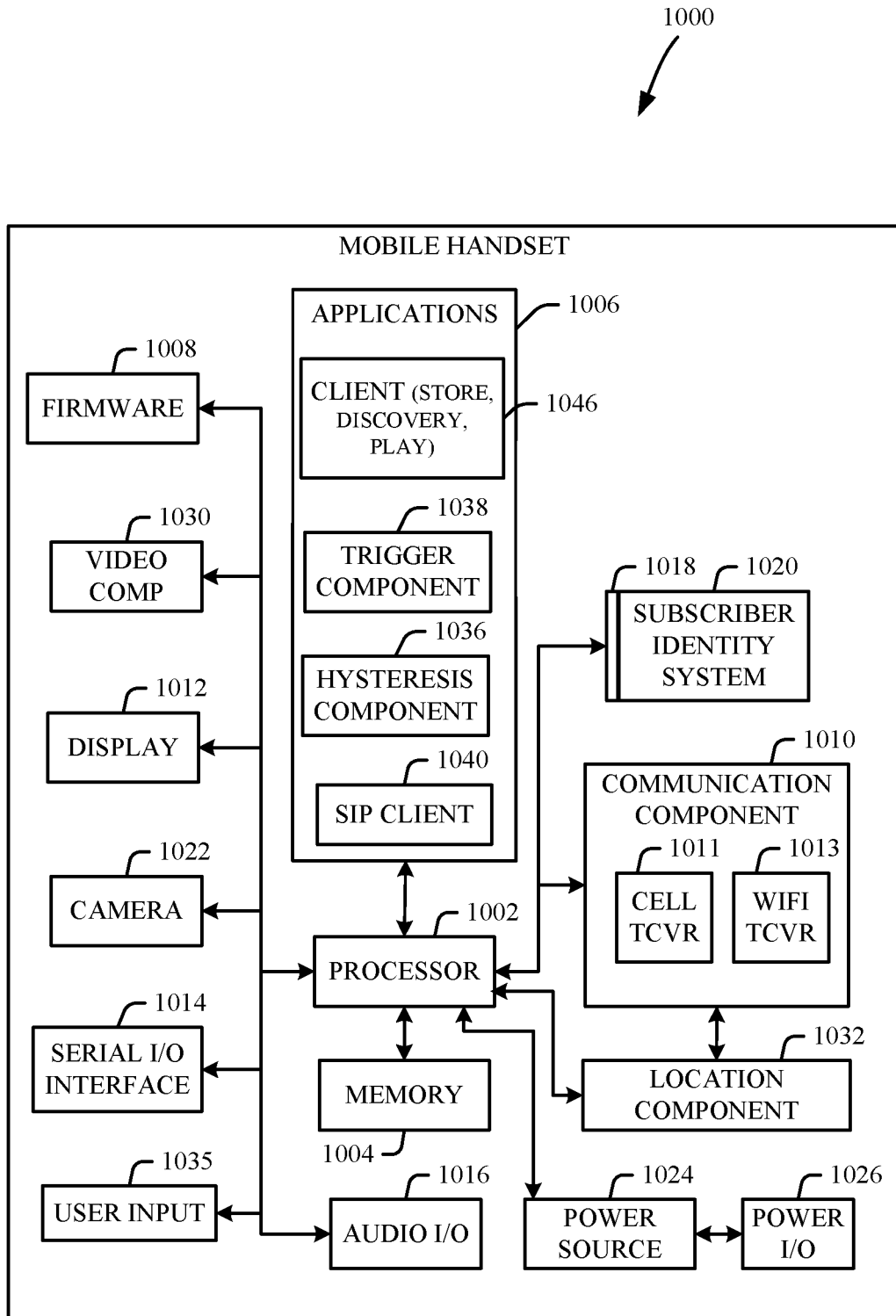
FIG. 10 illustrates an example block diagram of an example user equipment that can be a mobile handset in accordance with various aspects and embodiments of the subject disclosure.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
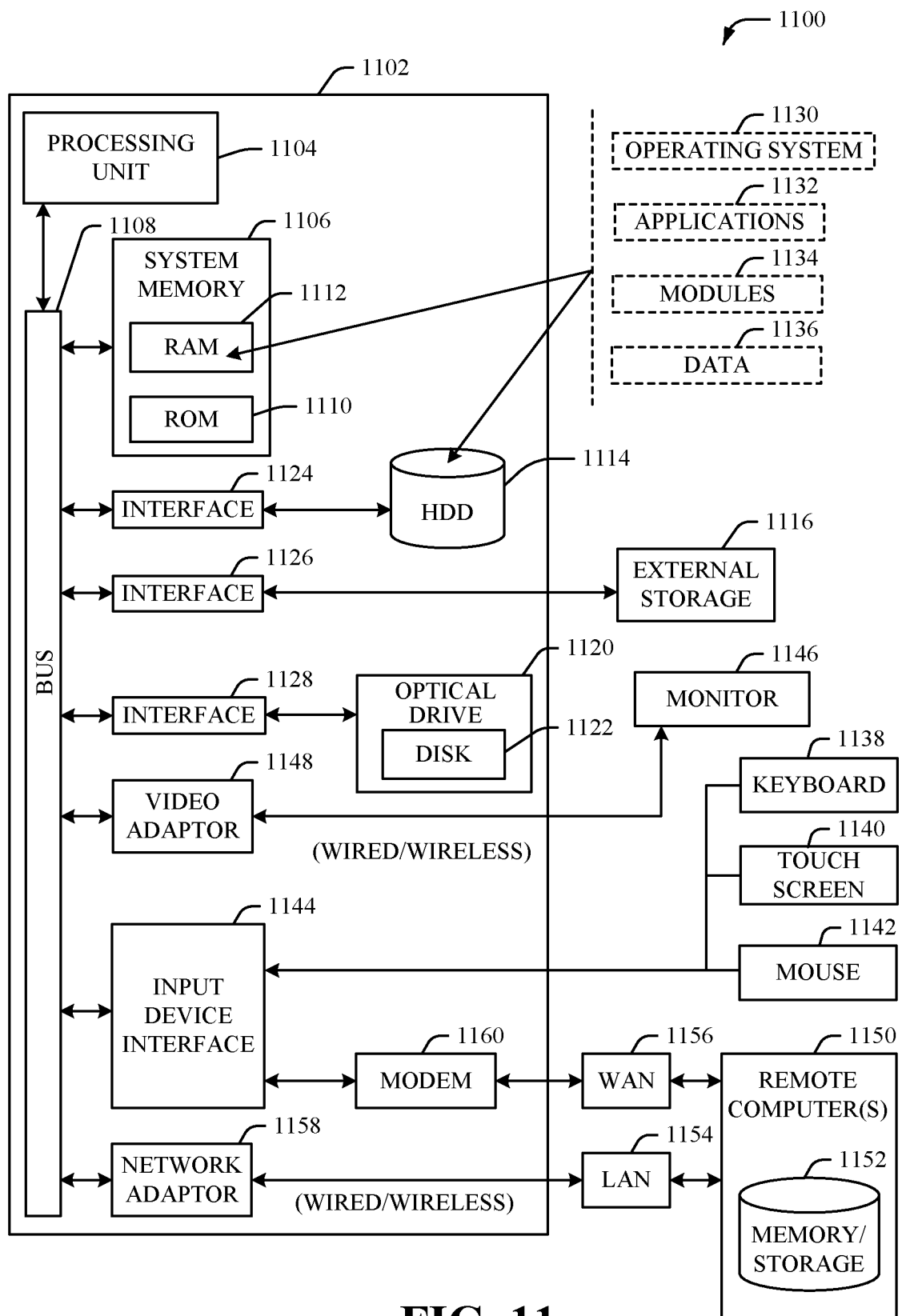
FIG. 11 illustrates an example block diagram of a computer that can be operable to execute processes and methods in accordance with various aspects and embodiments of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    facilitating, by network equipment comprising a processor, configuring repeater equipment to generate a forwarding layer that is logically above a physical layer of a mobile termination function of the repeater equipment and a distributed unit function of the repeater equipment, the configuring comprising:
        sending, by the network equipment, a configuration to the repeater equipment, using a first frequency band that configures the repeater equipment to communicate, via the forwarding layer using a second frequency band different than the first frequency band, at least one of: data plane signals or control plane signals; and
    indicating, by the network equipment via a main cell group communicatively coupled to the mobile termination function of the repeater equipment, control plane resources for a repeater equipment link frequency of the repeater equipment on a primary cell, and indicating data plane resources for an access link communicatively coupled to a secondary cell.

2. The method of claim 1, further comprising receiving, by the network equipment from the repeater equipment, capability information representative of a capability to support communications using the first frequency band and the second frequency band, wherein the facilitating occurs based on the receiving.

3. The method of claim 1, wherein sending the configuration comprises sending the configuration via a main cell group communicatively coupled to the mobile termination function of the repeater equipment using a signaling radio bearer.

4. The method of claim 1, wherein sending the configuration comprises sending the configuration via physical layer signaling on a primary cell communicatively coupled to the mobile termination function of the repeater equipment.

5. The method of claim 1, wherein sending the configuration comprises sending the configuration via radio resource control signaling on a primary cell communicatively coupled to the mobile termination function of the repeater equipment.

6. The method of claim 1, further comprising indicating, by the network equipment via a primary cell communicatively coupled to the mobile termination function of the repeater equipment, second control plane resources for a second repeater equipment link frequency of the repeater equipment on the primary cell, and indicating second data plane resources for a second access link communicatively coupled to the secondary cell.

7. The method of claim 1, further comprising indicating, by the network equipment via the main cell group communicatively coupled to the mobile termination function of the repeater equipment, downlink data plane resources for the access link, and indicating uplink data plane resources for the access link.

8. The method of claim 1, further comprising indicating, by the network equipment via a primary cell communicatively coupled to the mobile termination function of the repeater equipment, downlink data plane resources for the access link, and indicating uplink data plane resources for the access link.

9. The method of claim 1, further comprising indicating, by the network equipment via the main cell group, uplink data plane resources for an access link frequency of the repeater equipment, and indicating downlink data plane resources for the access link frequency.

10. The method of claim 1, further comprising indicating, by the network equipment via a primary cell communicatively coupled to the mobile termination function of the repeater equipment, uplink data plane resources for an access link frequency of the repeater equipment, and indicating downlink data plane resources for the access link.

11. The method of claim 1, further comprising multiplexing, by the network equipment, communications on the repeater equipment link frequency and the access link.

12. The method of claim 1, wherein the sending configures the repeater equipment to communicate the control plane signals.

13. The method of claim 12, wherein the control plane signals use a sub-six gigahertz frequency range.

14. The method of claim 1, wherein the sending of the configuration occurs periodically in accordance with a schedule.

15. A repeater device, comprising:
a processor; and
a memory that stores executable instructions that, when executed by the processor of the repeater device, facilitate performance of operations, the operations comprising:
receiving, by a mobile termination function of the repeater device, configuration data from a parent node via a first frequency band;
in response to the receiving, configuring a forwarding layer logically above a first physical layer of the mobile termination function and a second physical layer of a distributed unit function of the repeater device to forward data plane signals received at the first physical layer via the second physical layer to user equipment via a second frequency band that is different from the first frequency band; and
multiplexing, by the repeater device based on the configuration data, repeater link data communicated via the first physical layer and access link data communicated via the second physical layer.

16. The repeater device of claim 15, wherein the operations further comprise sending, by the repeater device, repeater capability data to the parent node, wherein receiving the configuration data occurs in response to the sending.

17. The repeater device of claim 15, wherein receiving the configuration data comprises at least one of: receiving the configuration data from the parent node based on a schedule, receiving the configuration data from the parent node based on modified parameter data, or receiving the configuration data from the parent node based on a request from the repeater device.

18. The repeater device of claim 15, wherein the first frequency band is in the sub-six gigahertz frequency range and the second frequency band is in the millimeter wave frequency range.

19. A non-transitory machine-readable medium, comprising executable instructions that, when executed by a processor, facilitate performance of operations, the operations comprising:
receiving, first control plane signals from a parent node via a first frequency band that is being used for communicating second control plane signals with a user equipment;
receiving, at a repeater link corresponding to a first physical layer of a mobile termination function of repeater equipment, data plane traffic from the parent node via a second frequency band that is different from the first frequency band, wherein the data plane traffic comprises first data plane traffic;
forwarding, via a forwarding layer configured logically above the first physical layer and logically above a second physical layer of a distributed unit function of the repeater equipment, the data plane traffic to an access link corresponding to the second physical layer;
communicating the data plane traffic, via the access link and via the second frequency band, to the user equipment,
receiving, via the access link, second data plane traffic from the user equipment; and
forwarding, via the forwarding layer, the second data plane traffic to the first physical layer for communication of the second data plane traffic to the parent node via the repeater link.

20. The non-transitory machine-readable medium of claim 19, wherein the operations further comprise multiplexing communications of the repeater link and communications of the access link.

* * * * *